United States Patent
Steenwyk et al.

(10) Patent No.: US 7,633,301 B2
(45) Date of Patent: Dec. 15, 2009

(54) TRACK POSITION SENSOR AND METHOD

(75) Inventors: Timothy E. Steenwyk, Hudsonville, MI (US); Paul L. Kaliher, Naperville, IL (US); David Dzioba, Frankenmuth, MI (US)

(73) Assignee: TouchSensor Technologies, LLC, Wheaton, IL (US)

( * ) Notice: Subject to any disclaimer, the term of this patent is extended or adjusted under 35 U.S.C. 154(b) by 0 days.

(21) Appl. No.: 11/315,719

(22) Filed: Dec. 22, 2005

(65) Prior Publication Data

US 2006/0267385 A1 Nov. 30, 2006

Related U.S. Application Data

(60) Provisional application No. 60/638,197, filed on Dec. 23, 2004, provisional application No. 60/638,200, filed on Dec. 23, 2004, provisional application No. 60/638,198, filed on Dec. 23, 2004, provisional application No. 60/638,159, filed on Dec. 23, 2004.

(51) Int. Cl.
  *G01R 27/26* (2006.01)
  *G01R 29/12* (2006.01)
  *G08B 13/26* (2006.01)

(52) U.S. Cl. .................. 324/661; 324/658; 324/457; 340/561

(58) Field of Classification Search .............. 324/661, 324/658, 457; 340/561
See application file for complete search history.

(56) References Cited

U.S. PATENT DOCUMENTS

| | | | | |
|---|---|---|---|---|
| 3,915,154 A | * | 10/1975 | Cosentino | .......... 128/898 |
| 4,183,060 A | * | 1/1980 | Barnette et al. | ......... 369/106 |
| 5,844,486 A | * | 12/1998 | Kithil et al. | |
| 6,149,287 A | * | 11/2000 | Pastrick et al. | ......... 362/494 |
| 6,249,130 B1 | * | 6/2001 | Greer | ......... 324/687 |
| 6,351,994 B1 | * | 3/2002 | Pinkos et al. | ......... 73/432.1 |
| 2003/0122432 A1 | * | 7/2003 | Caldwell | ......... 307/125 |
| 2003/0169033 A1 | * | 9/2003 | Tromblee et al. | |
| 2005/0057065 A1 | * | 3/2005 | Endoh et al. | ......... 296/65.13 |
| 2005/0099175 A1 | * | 5/2005 | Barnabo et al. | ......... 324/207.2 |
| 2005/0151355 A1 | * | 7/2005 | Hanlon et al. | ......... 280/735 |

FOREIGN PATENT DOCUMENTS

| | | | | |
|---|---|---|---|---|
| EP | 1270314 A | * | 1/2003 | |
| FR | 2815586 A | * | 4/2002 | |
| WO | WO 99/05008 A | * | 2/1999 | |

OTHER PUBLICATIONS

Anonymous, Method for Adjusting Supplemental Inflatable Restraint Inflation Based on Seat Position, Research Disclosure, Mason Publications, Hampshire, GB.
PCT Search Report Dated Apr. 12, 2006.

* cited by examiner

*Primary Examiner*—Amy He
(74) *Attorney, Agent, or Firm*—Barnes & Thornburg LLP

(57) ABSTRACT

A low impedance sensor includes thin conductive electrodes on a dielectric substrate and detects proximity of a target metal object or structure moving along defined path such as a track. The sensor includes a first conductive electrode pad having a closed, continuous geometric form and a second conductive electrode surrounding the first electrode and spaced from the first electrode by a channel of non-conductive dielectric. The first and second electrodes are optionally disposed on the same surface of the substrate. An integrated control circuit is located on the substrate proximate the first and second electrodes, and is electrically coupled to the first and second electrodes.

14 Claims, 5 Drawing Sheets

TRACK POSITION SENSOR AND METHOD

CROSS REFERENCE TO RELATED APPLICATIONS

This application claims priority from and incorporates by reference the disclosure of U.S. Provisional Patent Application No. 60/638,197, filed Dec. 23, 2004. This application also claims priority from and incorporates by reference the disclosures of: U.S. Provisional Patent Application 60/638,200, filed on Dec. 23, 2004, and U.S. patent application Ser. No. 11/315,839, filed on Dec. 22, 2005, both entitled Shared Electrode Pattern Field Effect Sensor and Joystick; U.S. Provisional Patent Application 60/638,198, filed on Dec. 23, 2004, and U.S. patent application No. 11/315,717, filed on Dec. 22, 2005, both entitled Seat Control System; and U.S. Provisional Patent Application 60/638,159, filed on Dec. 23, 2004, and U.S. patent application No. 11/315,820, filed on Dec. 22, 2005, both entitled Keyless Entry Touch Pad System and Method.

FIELD OF THE INVENTION

The present invention relates to sensors or control actuators for detecting the presence of an object or structure, such as a metal rail, at a selected position along a defined path, such as a track, and the use of such sensors.

BACKGROUND OF THE INVENTION

It is desirable to control the explosive force deploying an automobile air bag so that the air bag's impact against a driver or passenger does not exceed safe thresholds. The amount of force used to deploy the air bag should be controlled as a function of seat position. For example, the air bag typically should be deployed with less force when the seat is close to, for example, the steering wheel than when the seat is distant from the steering wheel.

Automobile seats typically are fixed to a movable track or rail that can slide within or upon a second, stationary track or rail. As such, the seat can be moved along a path having terminal positions defined by the range of motion of the movable track relative to the stationary track. Using power or manual controls, the occupant can move the seat to a desired distance from the steering wheel.

The seat's proximity to the steering wheel can be determined, at least in part, by determining the position of the movable track affixed to the seat relative to the stationary track affixed to the floor using a conventional position sensor, such as a mechanical limit switch, an electronic switch, or a Hall effect sensor. Such sensors may be in communication with a controller, which controls air bag deployment based on the sensed position.

The stationary track typically is mounted to the automobile's floor and the movable track rides upon or within the stationary track. Debris, for example, toys, wads of aluminum foil, bits of food, coins and other foreign objects, often accumulates on the floor and under the seat, and may interfere with proper functioning of the seat's position sensor. Such debris may prevent detection or sensing of a target rail or object. If the seat track position sensor fails to function, an improper seat position indication may be processed by the air bag deployment controller, resulting in improper air bag deployment. As a result, the air bag may be deployed with an insufficient or excessive amount of force, resulting in injury or even death to the driver and/or passenger.

The inherent limitations of conventional sensors make them less than desirable for such applications. Conventional mechanical limit switches have proven unsuitable, given their moving parts are likely to break or wear out. Conventional electronic switches, such as capacitive switches have no moving parts to break or wear out. However, known electronic switches may respond to environments with Electro-Magnetic Interference (EMI) in unpredictable ways, and may not conform to increasingly rigid Electro-Magnetic Compatibility (EMC) standards. Hall effect sensors require precise placement of a magnet mounted on a target object and a sensor mounted in a position adapted to sense the target object. Both the target and the Hall effect sensor must be precisely mounted within tight tolerances to function reliably. Mounting the magnet and dedicated target have proven to be excessively difficult and therefore expensive.

BRIEF DESCRIPTION OF THE DRAWINGS

FIG. 12b is a plan view illustrating the sensor electrode pattern arrangement of FIG. 12a.

DETAILED DESCRIPTION OF THE INVENTION

Figure 1:
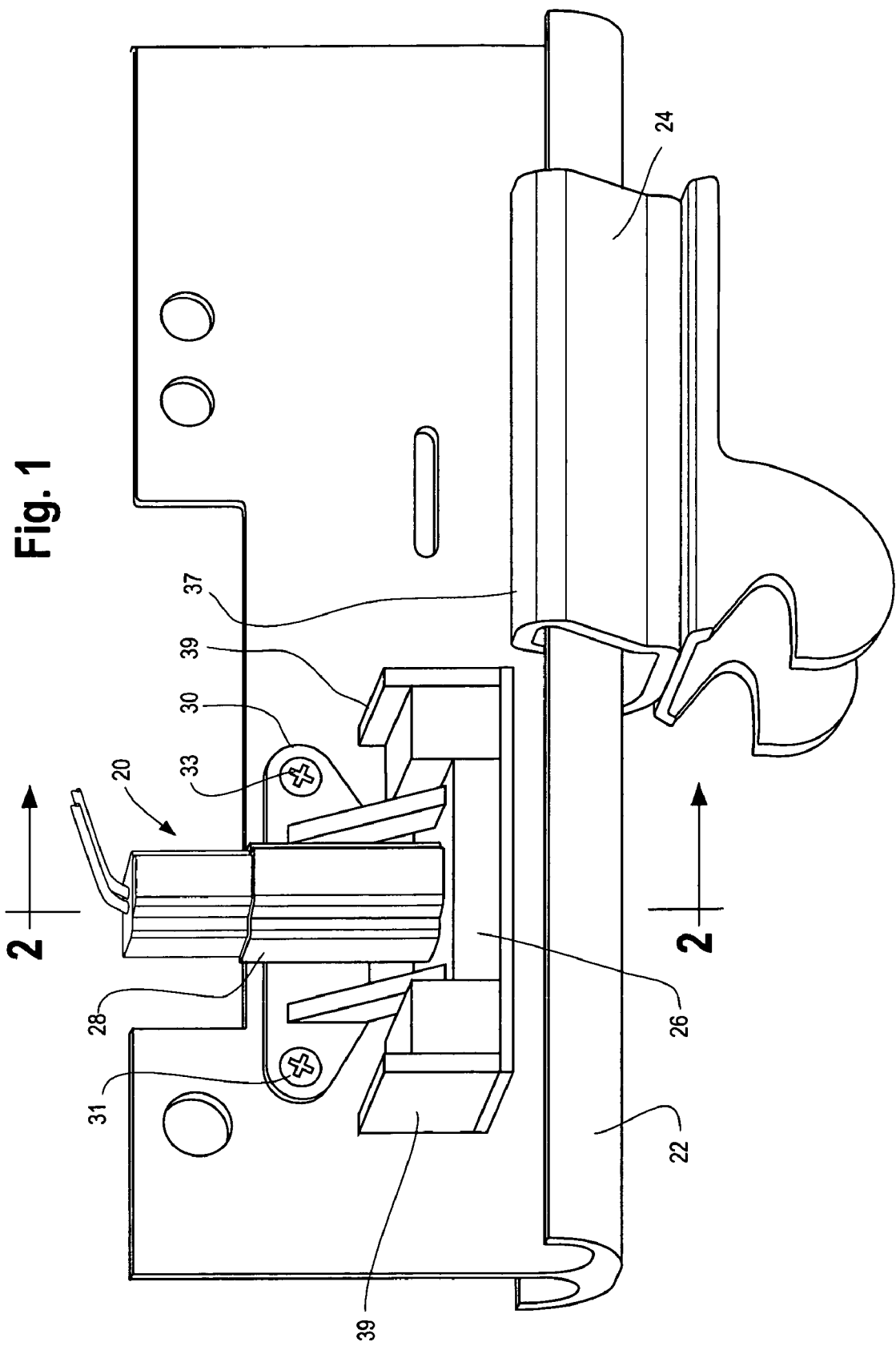
FIG. 1 is a fragmentary perspective view partially in section of a seat track sensor apparatus mounted on a movable rail that is slidably received within a fixed rail, in accordance with the present invention.
Figure 2:
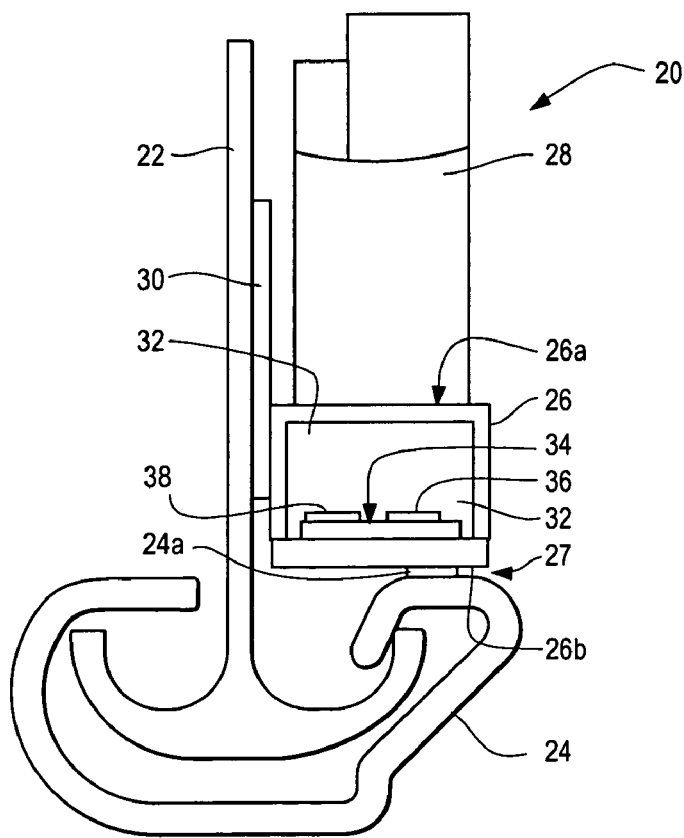
FIG. 2 is a cross-sectional view of the seat track sensor of FIG. 1 taken along line 2-2 and viewed in the direction of the arrows.

As best shown in FIGS. 1 and 2, a track position sensor 20 is secured to a first, movable rail 22 which is slidably received within a second, fixed rail 24. Sensor 20 includes a sealed protective housing 26 preferably made from a dielectric material such as polymer or fiber reinforced nylon. A sealable, releasable electrical connector 28 is disposed on an upper surface 26a of housing 26. Connector 28 provides first and second electrical connections to an interior cavity 32 of housing 26. Cavity 32 is sized to receive a sensor substrate 34, such as a printed circuit board ("PCB"), flexible circuit carrier, or the like. A clearance or air gap 27 is provided between a bottom surface 26b of housing 26 and second rail 24. Preferably, second rail 24 has a relatively wide, flat upper surface 24a.

Housing 26 may include first and second dielectric guard walls 39 that project upwardly from opposite ends of housing 26. Guard walls 39 sweep debris away from sensor assembly 20 when track rails 22, 24 move relative to one another. A support flange 30 extends from upper surface 26a of housing 26, and preferably includes one or more openings 31 which cooperate with threaded fasteners 33 for securing sensor 20 to rail 22. In other embodiments, other structures can be used to secure sensor assembly to rail 22.

Figure 3:
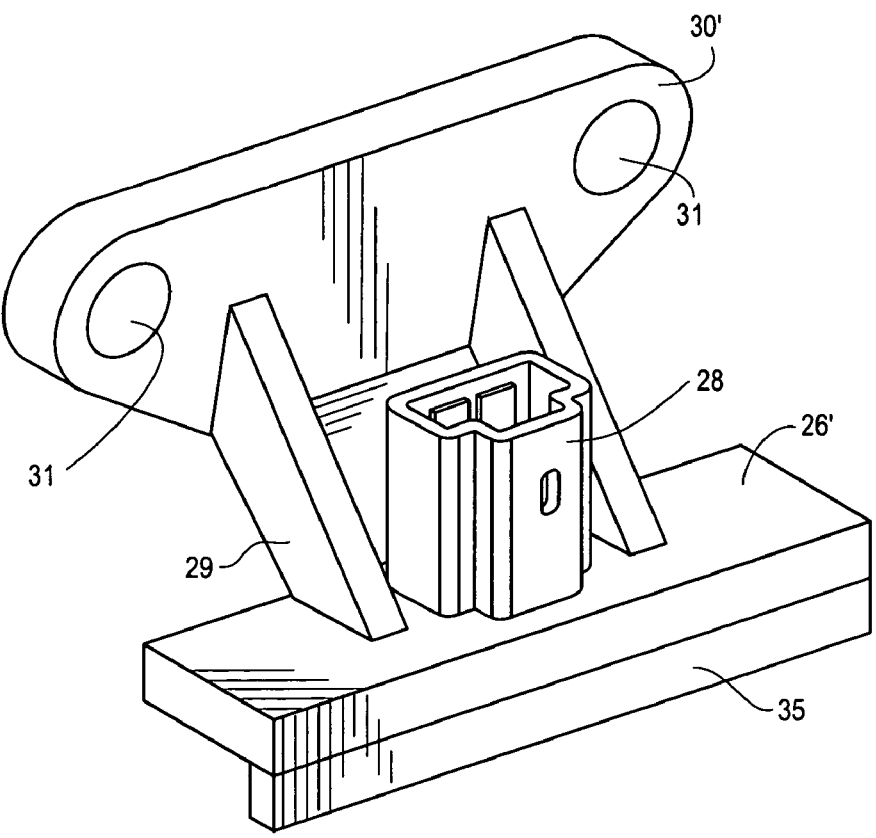
FIG. 3 is a perspective view of a sensor apparatus having a slightly different housing, in accordance with the present invention.

An alternative embodiment of a housing 26' is shown in FIG. 3. Housing 26' includes arms 29 which extend outwardly to a support flange 30'. A dielectric guard wall 35 projects downwardly from bottom surface 26b' of housing 26'. Guard wall 35 sweeps debris and foreign objects away from housing 26' when the track rails 22, 24 are moving relative to one another. It should be understood that housing 26 may further include guard wall 35, and housing 26' may further include guard walls 39. Thus, one skilled in the art would understand that various configurations may be provided for sweeping debris away from the housing 26. Hereafter, the disclosed invention generally will be described with referenced to housing 26.

Figure 4:
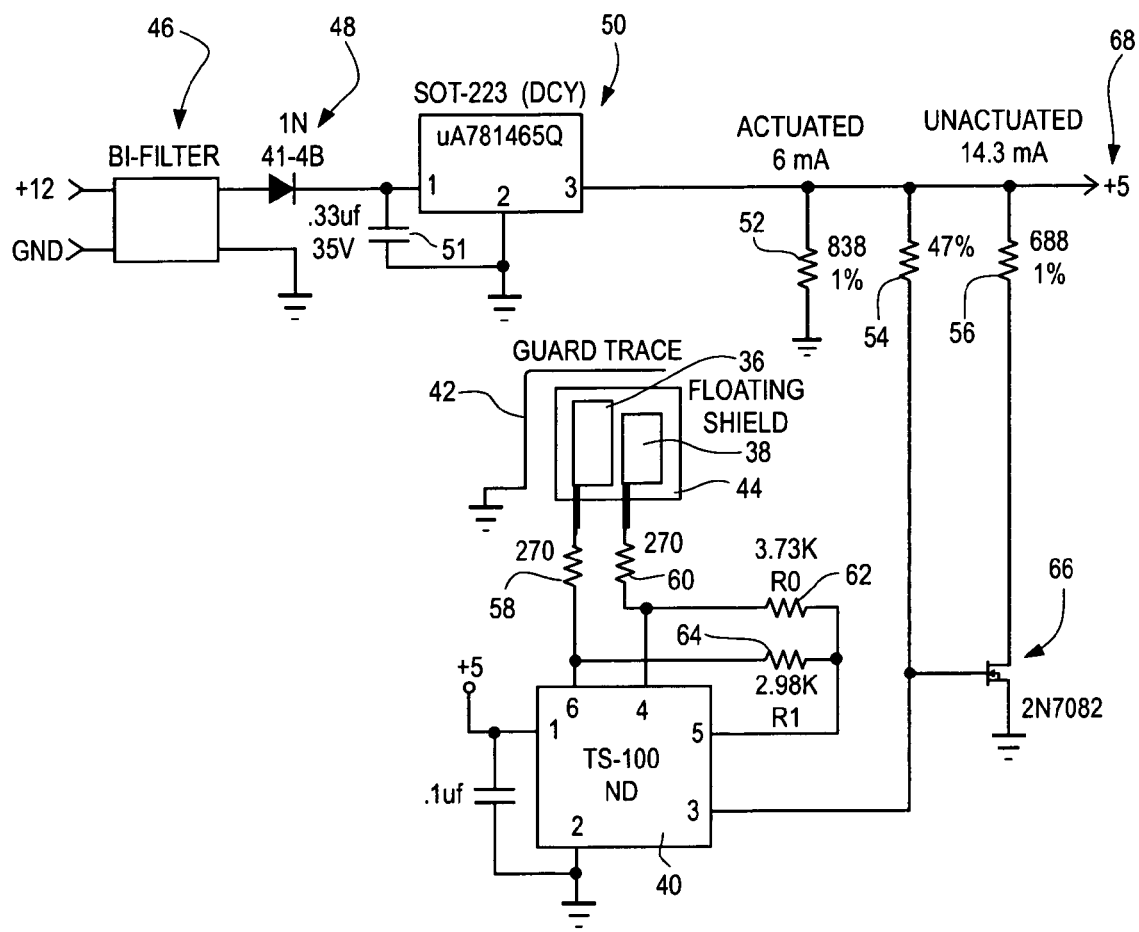
FIG. 4 is a schematic diagram illustrating the electrical connections among the components on the sensor substrate, in accordance with the present invention.
Figure 5:
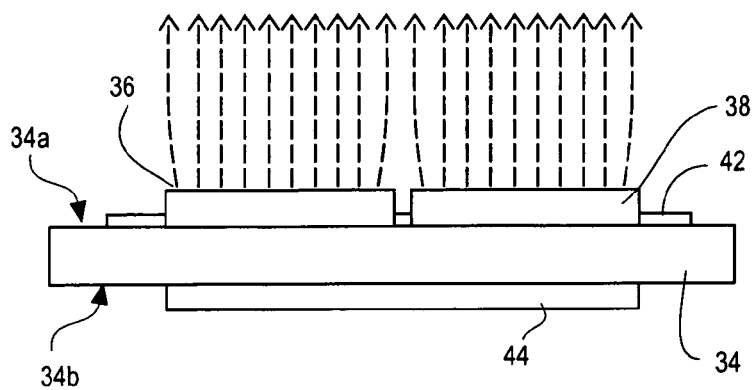
FIG. 5 is a cross-sectional view of a substrate with electrodes, floating shield and grounded guard trace, with dashed lines representing electric flux concentration.

As shown in FIGS. 4 and 5, sensor 20 preferably includes a first conductive electrode pad 36 and a second conductive electrode pad 38 disposed on a first surface 34a of dielectric sensor substrate 34. Preferably, first electrode 36 and second electrode 38 are positioned in a side-by-side relationship. Each electrode 36, 38 is coupled to a pulse generation circuit and a pulse detection circuit. In a preferred embodiment, the pulse generation and detection circuits preferably are embodied on integrated control circuit 40, which is coupled to first electrode 36 via resistors 58, 64 and to second electrode 38 via resistors 60, 62. Preferably, resistors 58-64 are external to integrated control circuit 40, as shown in the drawings. In an alternate embodiment (not shown), resistors 58-64 can be embodied on integrated control circuit 40.

Substrate 34 preferably has a substantially uniform thickness and can be manufactured from any type of dielectric material such as glass, ceramic or plastic. Alternatively, the substrate may have a varying thickness including dimples or depressions, so long as substrate geometry varies in a controlled and reproducible manner. In a preferred embodiment, substrate 34 is manufactured from a fiber reinforced polymer or epoxy and has a uniform thickness of approximately 2 mm. The thickness of substrate 34 varies with the particular application such that a thicker substrate may be used where additional strength is required. Substrate 34 can be manufactured from a flexible material for use in applications where sensor 20 must conform to a non-planar shape or applications requiring a directional sensor.

If substrate 34 is manufactured from glass, the substrate can be as thin as approximately 1.1 mm and as thick as approximately 5 mm. If substrate 34 is manufactured from plastic, the substrate can be less than 1 mm thick. As noted above, substrate 34 includes a thin, conductive inner electrode 36 and a thin, conductive outer electrode 38 adjacent to or surrounding the inner electrode 36. A non-conductive expanse of PCB surface or channel is located between inner electrode 36 and outer electrode 38. Electrodes 36 and 38 are preferably positioned such that the non-conductive channel has a substantially uniform width, as seen in plan view.

Figure 6:
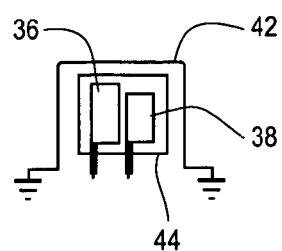
FIG. 6 is a plan view of sensor electrodes, floating shield and grounded guard trace, in accordance with the present invention.

As best seen in FIGS. 4 and 6, electrodes 36, 38 preferably comprise substantially rectangular thin conductive pads having a predetermined surface area. The surface areas of first and second electrodes 36, 38 can be substantially the same or different. In a preferred embodiment, second electrode 38 is spaced from first electrode 36 by a non-conductive channel region. It will be understood that various closed, continuous geometric conductive shapes may also be used for electrodes 36, 38 including, but not limited to, rectangles, trapezoids, circles, ellipses, triangles, hexagons, and octagons. Regardless of the shape of first electrode 36, second electrode 38 may be adjacent to or may substantially surround first electrode 36 in a spaced apart relationship with a non-conductive channel or space between electrodes 36, 38.

Integrated control circuit 40 preferably is embodied as a TS-100 ASIC, an integrated circuit available from TouchSensor Technologies LLC of Wheaton, Ill. The general principles of operation of the TS-100 ASIC are described in U.S. Pat. No. 6,320,282 to Caldwell, the disclosure of which is incorporated herein by reference. The pin-out of the TS-100 ASIC is as shown in the drawings, where the input power (+5 volts, Vdd) connection is on pin 1, the ground connection is on pin 2, the sensor signal output connection is on pin 3, the second or outer electrode resistor 62 is connected to pin 4, the excitation signal or "oscillator out" connection is at pin 5 and the inner pad electrode resistor 64 is connected to pin 6.

In operation, electrodes 36, 38 receive an excitation signal from the pulse generation circuit (e.g., pin 5 of the TS-100 ASIC). In the preferred embodiment, the excitation signal is a square wave oscillating between 0 and +5 volts at a frequency of approximately 32 kHz. Alternatively, the excitation signal may have a frequency of up to or greater than 200 kHz, depending on the detection circuitry used. Furthermore, the strobe signal may oscillate between 0 and +3 volts, 0 and +12 volts, 0 and +24 volts, −5 volts and +5 volts, or any other voltage range.

The excitation signal causes an electric field to be generated about each of electrodes 36, 38, as best shown by dashed lines in FIG. 5. Electrodes 36, 38 preferably are charged such that the electric fields emanating therefrom have the same polarity. As such, the fields repel and extend outwardly from first and second electrodes 36, 38. As best shown in FIGS. 4 and 5, a grounded conductive guard trace 42 may be provided to further shape these electric fields. Guard trace 42 is disposed on first surface 34a, and at least partially surrounds first and second electrodes 36, 38. Guard trace 42 may also substantially surround electrodes 36, 38, as best shown in FIG. 6. Optionally, a floating conductive shield 44 is disposed on a second surface 34b of substrate 34, and is at a floating potential, to further shape or direct the electric fields. Floating conductive shield 44 helps direct the electric fields away from substrate 34, with electric flux lines extending substantially perpendicular to electrodes 36, 38.

Introduction of a stimulus, such as a portion of rail 24, proximate sensor 20 causes the fields about one or both of electrodes 36, 38 to be disrupted. The detection circuit (preferably embodied in integrated control circuit 40) senses and compares such disruptions to the electric fields. In the preferred embodiment, the detection circuit outputs to an external control circuit a control signal when the field about first electrode 36 is disturbed to a predetermined greater degree than is the field about second electrode 38.

FIG. 4 illustrates such an external control circuit coupled to output pin 5 of integrated control circuit 40. A +12 volt supply and ground are connected through a bifilar coil or choke 46 and through a series connected diode 48 to a voltage regulator 50 and a shunt storage capacitor 51. The output of voltage regulator 50 is coupled to field effect transistor (FET) 66 through resistors 54, 56 and to output connection 68. In a preferred embodiment, the output of TS-100 ASIC controls the gate of switching FET 66 such that when sensor 20 is actuated, as discussed further below, a six milliamp current passes through output connection 68, and when sensor 20 is not actuated, a current of just over fourteen milliamps passes through output connection 68. The signal at output connection 68 can be used to control a controlled device, such as an air bag deployment controller.

Referring again to FIGS. 1 and 2, sensor 20 preferably is secured to movable rail 22 so that bottom surface 26b of housing 26 is aligned with and in close proximity to a upper surface 24a of fixed rail 24 when movable rail 22 is in certain positions with respect to fixed rail 24 and otherwise is relatively distant from rail 24 or any other object. The walls defining housing 26 have sufficient thickness to keep foreign objects at an adequate minimum stand-off distance from cavity 32 to prevent interference with sensor operation. Substrate 34 is positioned within cavity 32 so that the electric fields emanating from electrodes 36, 38 extend through bottom surface 26b of housing 26. Guard trace 42 and optional floating shield 44 help direct the electric fields as described above, so that the electric flux lines are substantially perpendicular to bottom surface 26b.

Referring to FIGS. 1 and 2, electrodes 36 and 38 are positioned on substrate 34 so that the electric field associated with electrode 36 will be disrupted by rail 24 when upper surface 24a of rail 24 is adjacent sensor 20. Sensor 20 preferably is configured such that the electric field associated with electrode 38 is not disturbed by rail 24, regardless of the relative positions of rails 22, 24. In use, rail 22 slides along rail 24 until an end 37 of upper surface 24a of rail 24 comes into proximity with and thereby disturbs the electric field associated with electrode 36. The detection circuit senses that the electric field about electrode 36 is disturbed to a predetermined greater degree than is the electric field about electrode 38 and outputs a signal indicative of rail 24's proximity to rail 22. In this way, sensor 20 detects relative movement of rail 22 along track 24 from a first position to a second position. In response, a signal such as an end-of-track signal is generated and transmitted to one or more controlled devices or indicators, such as an air bag deployment controller.

Figure 7:
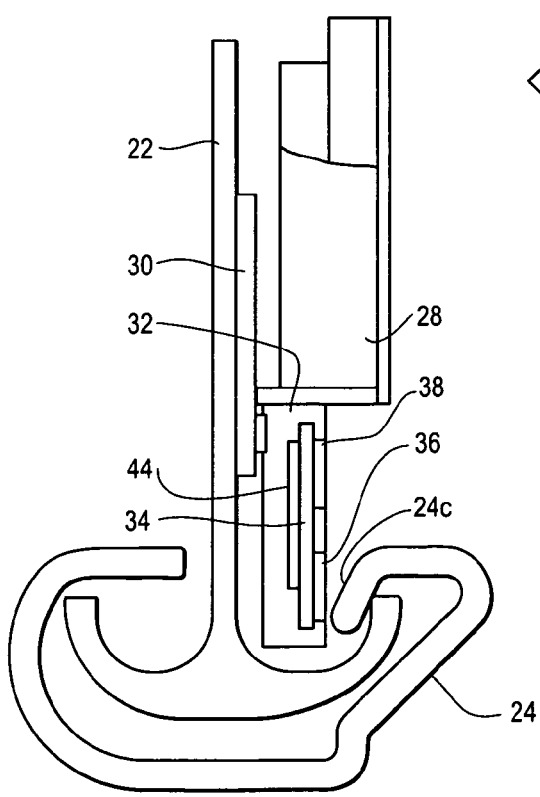
FIG. 7 is a cross-sectional view of a seat track sensor with a housing and electrode orientation according to another embodiment.

Various alternative configurations and arrangements of electrodes 36, 38 on substrate 34 may be provided wherein the electric field about only one of electrodes 36, 38 is disrupted by the target to be sensed. For example, substrate 34 may be provided within a housing 26" such that first electrode 36 aligns with an inner arm 24c of rail 24, as best shown in FIG. 7. Second electrode 38 is spaced from first electrode 36 and disposed within cavity 32 of housing 26" such that rail 24 only disrupts the electric field associated with first electrode 36.

Figure 8:
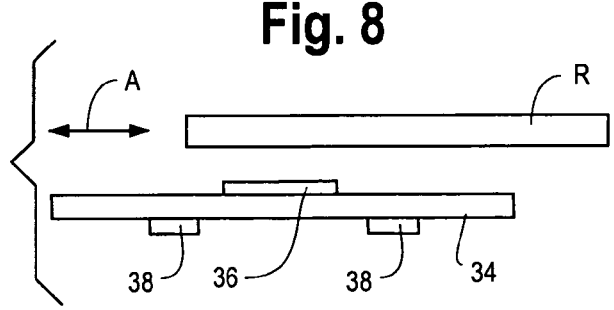
FIG. 8 is a side view illustrating another embodiment of sensor electrode orientations, in accordance with the present invention.

Another embodiment of electrode orientations is best shown in FIG. 8. First electrode 36 is disposed on first surface 34a of substrate 34, and second electrode 38 is disposed on opposite second surface 34b. First electrode 36 preferably is a thin, conductive pad, and second electrode 38 preferably substantially surrounds the outline of first electrode 36 as projected onto second surface 34b of substrate 34. The object to be sensed, for example, metal rail R, moves substantially parallel to the plane of substrate 34, as shown by arrow A. Substrate 34 is arranged such that inner electrode 36 is closer to the path of relative movement of metal rail R, compared to electrode 38. The electric fields emanating from electrodes 36, 38 dissipate a relatively short distance from the electrodes. As such, rail R disrupts the electric field associated with electrode 36 to a greater degree than it disrupts the electric field associated with electrode 38, given that rail R is closer to electrode 36.

Figure 9:
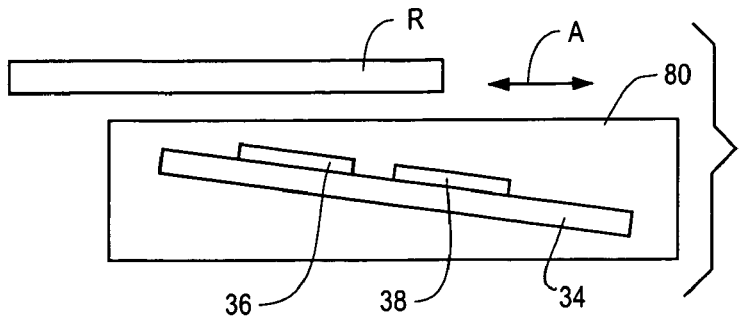
FIG. 9 is a side view illustrating another alternative embodiment of sensor electrode orientations, in accordance with the present invention.

Differential spacing of first and second electrodes 36, 38 with respect to rail R may be effected in numerous other ways, as well. For example, an angled electrode orientation may provide this differential spacing, as best shown in FIG. 9. There, first and second electrodes 36, 38 are both disposed on first surface 34a of substrate 34. Substrate 34 is angled relative to the path of movement of rail R, as shown by arrows A. Thus, when rail R is proximate substrate 34, rail R is closer to electrode 36 than to electrode 38. As such, rail R disrupts the electric field associated with electrode 36 to a greater degree than it disrupts the electric field associated with electrode 38 when rail R comes into proximity with the sensor. In response, a corresponding detection circuit outputs a signal indicative of proximity of rail R to the sensor corresponding to electrodes 36, 38. Preferably, substrate 34 is carried within an injection molded housing 80 and supported at an acute angle to the target's path (e.g., 10-15 degrees relative to the plane of the path of movement of rail R).

Figure 10:
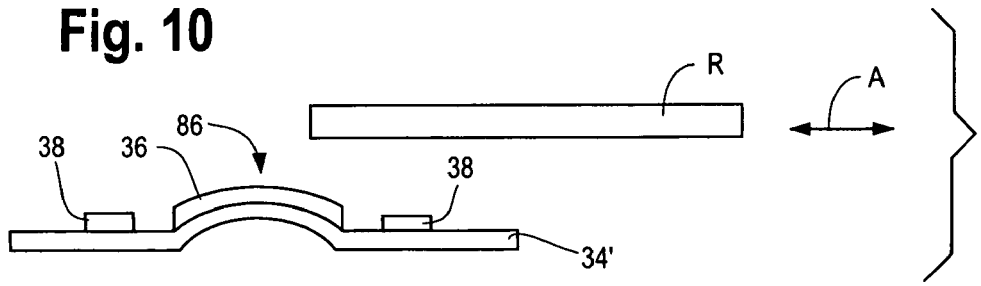
FIG. 10 is a side view illustrating another alternative embodiment of sensor electrode orientations, in accordance with the present invention.

Another alternative embodiment of sensor electrode orientations includes substrate 34' having a dome 86 defining a part spherical transverse projection therefrom, as best shown in FIG. 10. Dome 86 supports first electrode 36 on a side of substrate 34' nearest the path of relative movement of metal rail or target R. The path of relative movement is, as shown by arrows A, substantially parallel to the plane of the base of substrate 34' and proximate first electrode 36, preferably covering at least part of the dome-shaped surface of first electrode 36. Second electrode 38 is ring shaped and substantially surrounds first electrode 36. Second electrode 38 preferably has substantially the same surface area as first electrode 36. Second electrode 38 is carried on the planar base of substrate 34' and as such is farther away from the path of target rail R. In this configuration, rail R disrupts the field about first electrode 36 to a greater degree than it disrupts the field about second electrode 38 when rail R comes into proximity with the corresponding sensor.

Figure 11:
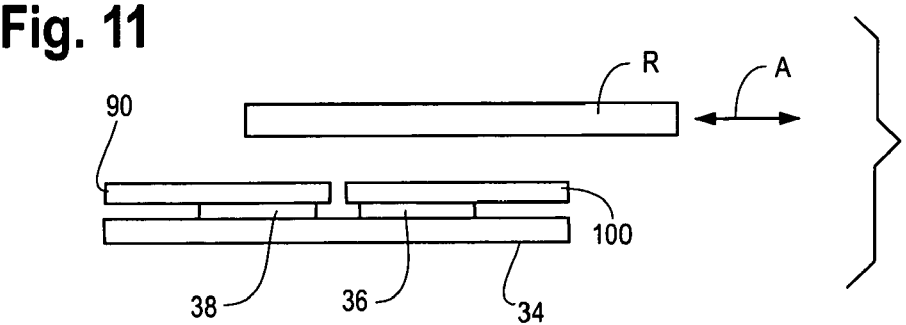
FIG. 11 is a side view illustrating another alternative embodiment of sensor electrode orientations, in accordance with the present invention.

A layered embodiment of the sensor electrode orientations includes substrate 34 arranged to support first electrode 36 and second electrode 38 on first side 34a of substrate 34 is best shown in FIG. 11. The relative sensitivities of the electrodes are adjusted by layering an outer planar dielectric substrate with selected dielectric constant over each electrode. In the illustrated embodiment, a low dielectric constant substrate material layer 90 is positioned on second electrode 38 and a relatively higher dielectric constant substrate material layer 100 is positioned on first electrode 36. The layered electrode assembly thus constructed is positioned near the path (for relative movement) of seat track metal bar or rail R. The path of relative movement is, as shown by arrows A, substantially parallel to the plane of substrate 34 and across first electrode 36 and second electrode 38, preferably covering at least part of the surface of first electrode 36. Second electrode 38 preferably has substantially the same surface area as first electrode 36 and is carried on substrate 34 beside first electrode 36 in a position aligned along the path. As would be understood by one skilled in the art, this configuration of electrodes and layers having different dielectric constants permits rail R to couple to or disturb the electric field about first electrode 36 to a greater degree than it does the field about second electrode 38 when rail R comes into proximity with the sensor.

Figure 12A:
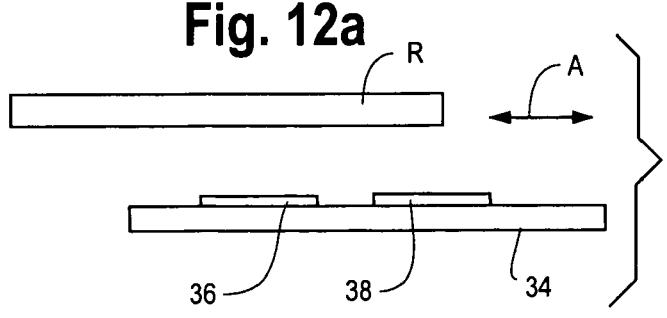
FIG. 12a is a side view illustrating another alternative embodiment of sensor electrode orientations, in accordance with the present invention.
Figure 12B:
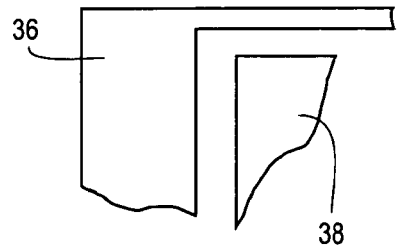

FIGS. 12a and 12b illustrate yet another embodiment of the sensor electrode orientations, including planar substrate 34 arranged to support first electrode 36 near the path of movement of target rail R. The path of movement of rail R is, as shown by arrow A, substantially parallel to the plane of first and second electrodes 36, 38 and preferably "covers" at least one half of the surface of first electrode 36 when positioned proximate the sensor. Second electrode 38 preferably has a smaller surface area than first electrode 36, as shown in FIG. 12b. As would be understood by one skilled in the art, this configuration permits rail R to couple to or disturb the electric field about first electrode 36 to a greater degree than it does the field about second electrode 38 when rail R comes into proximity with the sensor based on the differential sizing of first and second electrodes 36, 38.

It should be understood that while the embodiments have been described with reference to one sensor 20 for sensing movement of a target along the relative path of movement of that target, multiple sensors 20 may be provided along the path of movement. For some applications, it may be desirable to have more than one sense point along a path of movement. For example, multiple sensors 20 may be spaced along and fixed to movable rail 22. As rail 22 slides along rail 24, a specific sensor 20 may be actuated, as described above. Depending on which sensor along rail 22 is actuated, an associated controller would determine the precise position of rail 22 with respect to rail 24. Thus, multiple sense points may be provided using multiple sensors.

It will be appreciated by those of skill in the art that floating shield 44 and grounded guard trace 42 provide directionality to sensor 20. The two side-by-side seat sensor electrodes 36, 38 are situated on one side of substrate 34 and project an electric field that is primarily bi-directional, existing both above and below the plane of substrate 34. (The electric field also projects off the edge of the electrodes and there are probably flux concentrations at the corners of each of the electrodes, but these flux lines are not intended to be affected by floating shield 44 of FIG. 5.)

Floating shield 44 effectively enables the corresponding detection circuit to sense only disturbances to the electric fields emanating from the corresponding electrodes 36, 38 in one predetermined direction, and not in the opposite direction. This is desirable because the seat track target typically is located only on one side of substrate 34, for example, below substrate 34. Any stimulus causing a disturbance above substrate 34 typically is not of interest to the sensor and can cause erroneous actuations.

The floating shield 44 works electrically by uniformly distributing any electrical charge at its location over the two dimensional footprint of the two electrodes 36, 38. This charge distribution takes place at some non-zero height above the two electrodes. The larger the distance, the less the neutralizing effect of floating shield 44.

Floating shield 44 also has a side effect; it increases the mutual capacitance between the two electrodes 36, 38. This, in turn, makes it more difficult to induce a difference between the two electrodes from any actuation target, including those below substrate 34. The floating shield 44 reduces the sensitivity of the sensor cell for any given sensitivity setting (as dictated by the gain-setting resistors attached to the TS-100).

It is undesirable to ground the floating shield 44, at least for the sensor's seat track application. Floating shield 44 preferably is not grounded due to its size and proximity to the two electrodes 36, 38. Grounding floating shield 44 would shunt much of the electric field to ground, thereby possibly rendering sensor 20 ineffective or inoperative. The floating shield 44 communizes charge input to the two electrodes 36, 38 from one direction (e.g., up), without overly reducing the sensitivity of the two electrodes in the other (downwardly) direction.

Unlike the floating shield, the grounded guard trace 42 shunts electric lines of flux, which are at a substantial distance from the two electrodes 36, 38, to ground. Additionally, grounded guard trace 42 shunts to ground stray electric fields that may be presented to the outside surface of the seat sensor's housing so as to minimize their effect on the two electrodes. Also, grounded guard trace 42 stabilizes the electric field environment immediately surrounding the two electrodes 36, 38.

The mounting surface of the inner rail is a large metallic mass and it acts upon the electrode which is closest to it, shunting more of its electric field than that of the other electrode which is at a greater distance from the mounting surface. Consequently, sensor 20 operates differently when not mounted on the rail than when mounted on the rail. This makes tuning and evaluation of sensor 20 more difficult. Grounded guard trace 42 acts to minimize this effect.

As shown in FIG. 6, grounded guard trace 42 need not surround all four sides of the arrangement of electrodes 36, 38. For example, in applications where electrodes 36, 38 are located a relatively large distance from the far end of the sensor assembly, the corresponding air gap creates the required isolation from this direction. The remaining unimpeded direction is the downward direction. This is where the intended target lies.

Foreign objects and material will from time-to-time approach and even make contact with the sensor housing (e.g., 26). Both electrical means and physical means are used to prevent foreign objects and debris from affecting the operation of the sensor. The electrical means are described above. The physical means involve selecting the appropriate dimensions for the outer shell of the housing, shaping the housing such that objects and materials cannot cause actuation, and the use of physical barriers (fences or cow-catcher-like barriers) extending from the housing to prevent objects and materials from approaching a sensitive area of the sensor. In particular, for the illustrated application, a plastic shield extends from the housing 26 over the outer rail to prevent objects and material from getting between the outer rail 24 and the sensor 20.

Having described preferred embodiments of a new and improved method and structure, it is understood that other modifications, variations and changes will be suggested to those skilled in the art in view of the teachings set forth herein. It is therefore to be understood that all such variations, modifications and changes are believed to fall within the scope of the present invention as defined by the appended claims.

We claim:

1. A seat track sensor apparatus for detecting the position or proximity of a movable rail configured to move along a path defined by a fixed rail, said seat track sensor apparatus comprising:
   a dielectric substrate;
   a sensor comprising:
      a first conductive electrode pad disposed on a surface of said substrate in a substantially continuous form defining a pad surface area of conductive material;
      a second conductive electrode disposed on said surface of said substrate in a spaced relationship to said first electrode pad, and defining a surface area of conductive material; and
      an integrated control circuit (ICC) disposed on said substrate proximate said first and second electrodes and electrically coupled to said first and second electrodes, such that proximity of a selected rail activates the ICC; and a dielectric housing carrying said substrate, said housing including a support adapted to fasten said housing to one of the movable rail and the fixed rail, wherein said rail fastened to said sensor is designated a sensor mounting rail and the rail not fastened to said sensor is designated a triggering rail;

wherein said sensor is configured to sense the proximity of said target triggering rail when said movable rail moves along said defined path;

wherein the shortest distance between said triggering rail and one of said first conductive electrode pad and said second conductive electrode is greater than the shortest distance between said triggering rail and the other of said first conductive electrode pad and said second conductive electrode at least when the triggering rail and mounting rail are in first and second relationships with respect to each other along said path; and wherein the distance perpendicular to said path between said triggering rail and said second conductive electrode is greater than the distance perpendicular to said path between said triggering rail and said first conductive electrode pad when said triggering rail overlies at least a portion of each of said first conductive electrode pad and said second conductive electrode.

2. The seat track sensor apparatus of claim 1, wherein said substrate has a first surface opposing a second surface and said first electrode is situated in side-by-side orientation with respect to said second electrode.

3. The seat track sensor apparatus of claim 2, further comprising:
a conductive shield at floating potential disposed on said second surface of said substrate in a substantially continuous form defining an area that is substantially co-extensive with said pad surface area and said second electrode surface area.

4. The seat track sensor apparatus of claim 2, wherein said substrate is substantially planar.

5. The seat track sensor apparatus of claim 1, wherein said first conductive electrode pad and second conductive electrode are disposed on said surface of said substrate in a substantially coplanar relationship.

6. The seat track sensor apparatus of claim 1, wherein said dielectric housing support is fastened to said movable rail and carries said sensor substrate in an orientation that is parallel with said movable rail.

7. The scat track sensor apparatus of claim 1, wherein said dielectric housing support is fastened to said movable rail and carries said sensor substrate in an orientation that is angled with respect to said movable rail.

8. The seat track sensor apparatus of claim 1, wherein said housing has exterior walls or structural projections dimensioned to provide a selected stand-off distance to keep foreign objects at least said selected stand-off distance away from said sensor electrodes.

9. The seat track sensor apparatus of claim 8, wherein one of said housing exterior walls carries a downwardly projecting fence dimensioned to cover at least a portion of said fixed rail when said housing is fastened to said movable rail.

10. The seat track sensor apparatus of claim 1, wherein said dielectric housing is made of a polymer.

11. The seat track sensor apparatus of claim 1, wherein said dielectric housing is made of a glass filled nylon.

12. The apparatus of claim 1 wherein said substrate comprises a planar portion and a projecting portion, wherein said first conductive electrode pad is disposed on said projecting portion and said second conductive electrode is disposed on said planar portion.

13. A method for sensing the position or proximity of an object or a structure movable along a defined path, comprising the steps of:
(a) providing a dielectric substrate having first and second opposing surfaces;
(b) providing a sensor comprising:
first conductive electrode pad disposed on a surface of said substrate in a substantially continuous form defining a pad surface area of conductive material;
a second conductive electrode disposed on said surface of said substrate in a spaced relationship to said first electrode pad, and defining a surface area of conductive material;
an integrated control circuit (ICC) disposed on said substrate proximate said first and second electrodes and electrically coupled to said first and second electrodes, such that proximity of a triggering object or structure activates the ICC; and
(c) moving said sensor along the path from a first position wherein said ICC is not activated to a second position wherein said ICC is activated, wherein the distance perpendicular to said path between said object or structure and said second conductive electrode is greater than the distance perpendicular to said path between said object or structure and said first conductive electrode pad when said object or structure overlies at least a portion of each of said first conductive electrode pad and said second conductive electrode.

14. The method of claim 13, further comprising the step of:
(d) generating an end of track signal in response to sensing activation of said ICC.

* * * * *

UNITED STATES PATENT AND TRADEMARK OFFICE
CERTIFICATE OF CORRECTION

| | | |
|---|---|---|
| PATENT NO. | : 7,633,301 B2 | Page 1 of 1 |
| APPLICATION NO. | : 11/315719 | |
| DATED | : December 15, 2009 | |
| INVENTOR(S) | : Timothy E. Steenwyck | |

It is certified that error appears in the above-identified patent and that said Letters Patent is hereby corrected as shown below:

Please amend claim 1 as follows:

At column 9, line 11, delete the word "target."

Please amend claim 13 as follows:

At column 10, line 25, insert the word --a-- before the word "first."

At column 10, line 31, insert the word --and-- after the ;

Signed and Sealed this

Sixteenth Day of March, 2010

David J. Kappos
*Director of the United States Patent and Trademark Office*